G. H. MORROW.
SHIM HOLDER.
APPLICATION FILED JAN. 20, 1919.

1,368,646.

Patented Feb. 15, 1921.

INVENTOR.
GEORGE H. MORROW.
BY
ATTORNEY

UNITED STATES PATENT OFFICE.

GEORGE H. MORROW, OF PORTLAND, OREGON.

SHIM-HOLDER.

1,368,646. Specification of Letters Patent. Patented Feb. 15, 1921.

Application filed January 20, 1919. Serial No. 272,081.

*To all whom it may concern:*

Be it hereby known that I, GEORGE H. MORROW, a citizen of the United States, residing in the city of Portland, county of Multnomah, and State of Oregon, have invented a new and useful Shim-Holder, of which the following is a specification.

My invention relates more particularly to the holding of shims against the upper half of a bearing, such as a connecting rod, while the lower half is removed for repairs, or for changing the amount or number of shims between the halves of a crank pin bearing.

The object of my invention is to permit the removal of the cap which secures the connecting rod to the crank shaft without the inconvenience of holding the shims by hand, or removing same until the cap is restored to place, which operation, on account of the position of the parts, is quite difficult.

A further object is to remove the danger of dropping the shims and changing the number and arrangement of same on the bolts.

Figure 1:
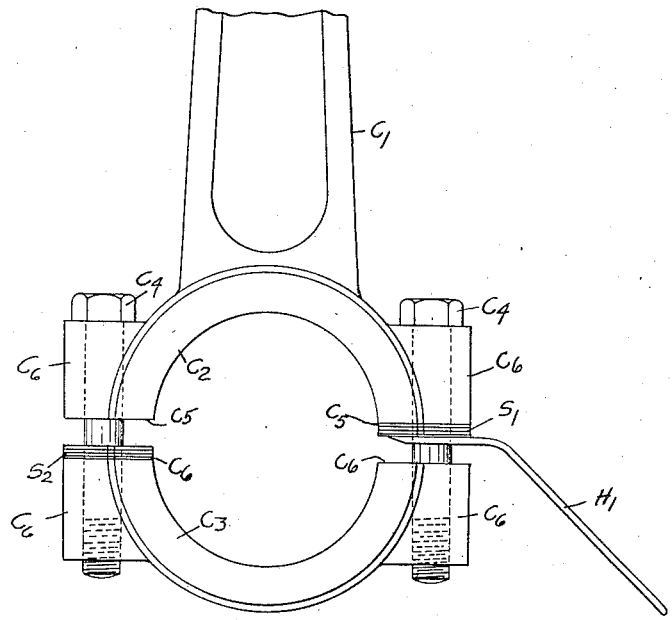
Figure 2:
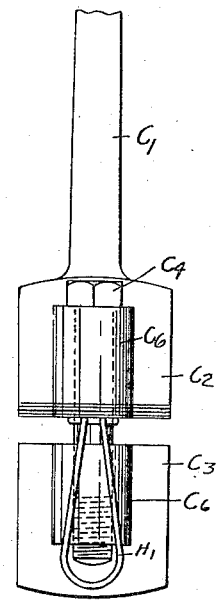
Figure 5:
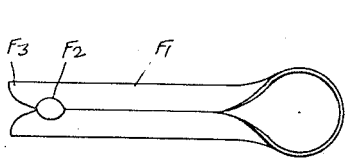
Figure 3:
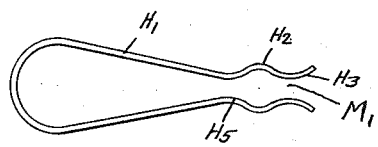
Figure 4:
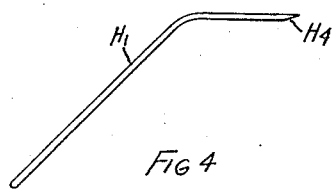

Referring to the drawing. Figure 1 is a front elevation of the lower end of a connecting rod showing the manner of applying my device. Fig. 2 is a side elevation of Fig. 1. Fig. 3 is a plan of the device, and Fig. 4 is an elevation of same. Fig. 5 shows a modified form of my device.

Referring in detail to the drawing. $C^1$ is the usual form of connecting rod found on internal combustion engines. $C^2$ is the upper half of the crank pin bearing of which $C^3$ is the cap, the two parts of the bearing being held together by means of the bolts $C^4$, from which the nuts have been removed for the purpose of illustrating the action of my device. The bolts $C^4$ pass through the lugs $C^6$ and the shims $S^1$ and $S^2$, said shims having the shape of a cross section of the crank pin bearing at the point of union of the halves. $C^5$ is the under side of the connecting rod bearing, and $C^6$ is the upper side of the cap $C^3$. Bearing $C^2$ and cap $C^3$ are supported by the shims $S^1$ and $S^2$. $H^1$ is the handle of my device, which is a wire bent into the form of a U with its open ends converging, each one forming a reverse curve near its point, the curves being opposite and facing each other so that the two curves $H^2$ constitute recesses which form a pocket, which is the point at which my device secures itself to the bolts $C^4$, while the curves $H^3$ serve to help in causing the mouth $M^1$ of my device to pass around the bolt $C^4$. Curve $H^5$ acts as a shoulder to improve the clamping effect of the device, the sides $H^1$ being held together to produce a spring effect on the two free ends of the device. The sharpened points $H^4$ assist in inserting the ends of the device between the lower shim $S^1$ and the face $C^6$.

The Figs. 1 and 2 illustrate the means of applying the device in order to prevent the shims from falling off when cap $C^3$ is removed. It will be seen that the shims $S^2$ which are not so held are resting on the face $C^6$ and will come off with the cap $C^3$.

The operation of my device is as follows: When desiring to remove the cap $C^3$ of the connecting rod $C^1$ for any purpose whatsoever, it is only necessary to loosen the nuts of the bolts $C^4$ sufficiently to allow the points $H^4$ of my device to be inserted between the lowermost shim $S^1$ and the face $C^6$ of the cap $C^3$, and by pushing same toward the center of the crank pin until the bolt $C^4$ occupies the space between the curves $H^2$. The cap $C^3$ may now be completely removed while the shims $S^1$ retain the position shown in Fig. 1.

As illustrated in Fig. 5 I employ a flat spring wire instead of the round wire, which has a number of advantages such as thin tips which assist in inserting same between shims and flat finger grips. $F^1$ represents the arm members of my device constructed of flat spring wire. $F^2$ is the bolt clasping recess. $F^3$ are the flaring tips for assistance in finding the bolt.

While I have thus described my invention, it is not my intention to limit myself to this precise form, but intend that it shall cover all forms and modifications that fall fairly within the appended claims.

What I claim as new and desire to protect by Letters Patent of the United States, is:

1. A shim holder consisting of a U shaped member constructed of flat wire whose free ends are twisted into the same plane and whose adjacent sides touch each other and have a recess formed between them and having the extreme tip formed into diverging curves in a manner to assist in finding a bolt, said extreme ends having chisel shaped tips adapted to assist in inserting the holder between the shim and the bearing cap and having the closed or handle portion of said shim holder bent downwardly at an angle to the plane in which the recessed portions lie in a manner to leave the point of said chisel shaped portion upward.

2. A shim holding device consisting of a U shaped member having opposed recesses formed in the parallel members thereof in the inner sides thereof and having the extreme tip of said open ends in wedge form.

3. A shim holding device consisting of a U shaped member having opposed recesses formed in the parallel members thereof in the inner sides thereof and near the open ends and having the closed end of said U shaped member bent downward from the horizontal plane in which lie the two open ends of said U shaped member.

GEORGE H. MORROW.